United States Patent
Gernon

(10) Patent No.: US 7,422,709 B2
(45) Date of Patent: Sep. 9, 2008

(54) ELECTROMAGNETIC RHEOLOGICAL (EMR) FLUID AND METHOD FOR USING THE EMR FLUID

(76) Inventor: Crosby Gernon, 800 N. 6th St., Hiawatha, KS (US) 66434-1717

(*) Notice: Subject to any disclaimer, the term of this patent is extended or adjusted under 35 U.S.C. 154(b) by 675 days.

(21) Appl. No.: 10/908,677

(22) Filed: May 23, 2005

(65) Prior Publication Data

US 2005/0258090 A1    Nov. 24, 2005

Related U.S. Application Data

(60) Provisional application No. 60/573,567, filed on May 21, 2004.

(51) Int. Cl.
*H01F 1/28* (2006.01)
*C09K 3/00* (2006.01)

(52) U.S. Cl. .............. 252/572; 623/24; 414/4; 252/62.51 R; 252/62.52; 252/570; 188/267.2

(58) Field of Classification Search .......... 623/24; 414/4; 252/62.51 R, 62.52, 570, 572; 188/267.2
See application file for complete search history.

(56) References Cited

U.S. PATENT DOCUMENTS

| | | |
|---|---|---|
| 3,906,415 A | 9/1975 | Baker |
| 4,035,718 A | 7/1977 | Chandler |
| 4,048,602 A | 9/1977 | Diamantides |
| 4,064,409 A | 12/1977 | Redman |
| 4,092,867 A | 6/1978 | Matzuk |
| 4,127,804 A | 11/1978 | Breaux |
| 4,204,933 A | 5/1980 | Barlow et al. |
| 4,281,263 A | 7/1981 | Virolleau et al. |
| 4,304,411 A | 12/1981 | Wilcock et al. |
| 4,386,823 A | 6/1983 | Musha |
| 4,392,040 A | 7/1983 | Rand et al. |

(Continued)

FOREIGN PATENT DOCUMENTS

DE    A1 19858665    6/1999

(Continued)

OTHER PUBLICATIONS

Listing of printed publications generated by third party search, Mar. 29, 2005.

*Primary Examiner*—David A Reifsnyder
(74) *Attorney, Agent, or Firm*—Hovey Williams LLP

(57) ABSTRACT

An electromagnetic rheological ("EMR") fluid (18) broadly includes a conducting medium (22) and a plurality of micronparticles (24) suspended in the medium (22). Each of the micronparticles (24) includes a magnetically permeable core (26), an electrically insulating coating (28) surrounding the core (26), and a conductive winding (30) at least partially wound around the core (26) so that the coating (28) is disposed between the winding (30) and the core (26). An apparatus (10) constructed in accordance with a preferred embodiment of the present invention broadly includes a deformable membrane (12), a pair of polar opposed plates (14 and 16) coupled to the membrane (12), the EMR fluid (18) filling the membrane (12) and being in communication with a current source (20). Current flowing through adjacent windings (30) induces magnetic fields in the corresponding micronparticles (24) that mutually draw the adjacent micronparticles (30) causing them to move together into a north pole-south pole alignment.

25 Claims, 4 Drawing Sheets

U.S. PATENT DOCUMENTS

| | | | |
|---|---|---|---|
| 4,408,313 A | 10/1983 | Musha | |
| 4,429,314 A | 1/1984 | Albright | |
| 4,437,064 A | 3/1984 | Overton, Jr. et al. | |
| 4,462,259 A | 7/1984 | Stoltman et al. | |
| 4,612,527 A | 9/1986 | Third et al. | |
| 4,732,706 A | 3/1988 | Borduz et al. | |
| 4,737,886 A | 4/1988 | Pedersen | |
| 4,808,079 A | 2/1989 | Crowley et al. | |
| 4,859,943 A | 8/1989 | Evans et al. | |
| 4,874,005 A | 10/1989 | Potter | |
| 4,944,185 A | 7/1990 | Clark, Jr. et al. | |
| 4,990,279 A | 2/1991 | Ahmed | |
| 4,992,192 A | 2/1991 | Ahmed | |
| 5,104,582 A | 4/1992 | Lindsten | |
| 5,109,240 A | 4/1992 | Engl et al. | |
| 5,147,573 A | 9/1992 | Chagnon | |
| 5,208,544 A | 5/1993 | McBrearty et al. | |
| 5,271,075 A | 12/1993 | Gfeller et al. | |
| 5,271,858 A | 12/1993 | Clough et al. | |
| 5,367,416 A | 11/1994 | Cossette et al. | |
| 5,396,802 A | 3/1995 | Moss | |
| 5,429,761 A | 7/1995 | Havelka et al. | |
| 5,457,523 A | 10/1995 | Facci et al. | |
| 5,468,042 A | 11/1995 | Heinrichs et al. | |
| 5,473,700 A | 12/1995 | Fenner, Jr. | |
| 5,507,967 A | 4/1996 | Fujita et al. | |
| 5,570,429 A | 10/1996 | Paddock | |
| 5,609,353 A | 3/1997 | Watson | |
| 5,660,397 A | 8/1997 | Holtkamp | |
| 5,673,721 A | 10/1997 | Alcocer | |
| 5,703,484 A | 12/1997 | Bieberdorf et al. | |
| 5,704,613 A | 1/1998 | Holtkamp | |
| 5,714,084 A | 2/1998 | Fujita et al. | |
| 5,714,829 A | 2/1998 | Guruprasad | |
| 5,756,207 A | 5/1998 | Clough et al. | |
| 5,756,896 A | 5/1998 | Schendel | |
| 5,816,587 A | 10/1998 | Stewart et al. | |
| 5,829,319 A | 11/1998 | Mokeddem | |
| 5,835,329 A | 11/1998 | Sucholeiki | |
| 5,852,404 A | 12/1998 | Amini | |
| 5,884,664 A | 3/1999 | Nagai et al. | |
| 5,899,220 A | 5/1999 | Alcocer et al. | |
| 5,969,448 A | 10/1999 | Liu et al. | |
| 5,971,835 A | 10/1999 | Kordonski et al. | |
| 6,020,664 A | 2/2000 | Liu et al. | |
| 6,029,978 A | 2/2000 | Pelstring et al. | |
| 6,062,081 A | 5/2000 | Schendel | |
| 6,123,312 A | 9/2000 | Dai | |
| 6,146,691 A | 11/2000 | Diaz et al. | |
| 6,159,396 A | 12/2000 | Fujita et al. | |
| 6,168,634 B1 * | 1/2001 | Schmitz | 623/24 |
| 6,242,994 B1 | 6/2001 | Li et al. | |
| 6,257,133 B1 | 7/2001 | Anderson | |
| 6,280,658 B1 | 8/2001 | Atarashi et al. | |
| 6,297,159 B1 | 10/2001 | Paton | |
| 6,337,125 B1 | 1/2002 | Diaz et al. | |
| 6,348,295 B1 | 2/2002 | Griffith et al. | |
| 6,352,144 B1 | 3/2002 | Brooks | |
| 6,353,733 B1 | 3/2002 | Murray et al. | |
| 6,355,166 B1 | 3/2002 | Amarasinghe et al. | |
| 6,369,400 B2 | 4/2002 | Haeberle et al. | |
| 6,371,267 B1 | 4/2002 | Kao et al. | |
| 6,489,694 B1 | 12/2002 | Chass | |
| 6,498,500 B1 | 12/2002 | Upton | |
| 6,504,271 B2 | 1/2003 | Chass | |
| 6,515,490 B1 | 2/2003 | Upton | |
| 6,522,926 B1 | 2/2003 | Kieval et al. | |
| 6,532,387 B1 | 3/2003 | Marchitto et al. | |
| 6,544,156 B2 | 4/2003 | Anderson | |
| 6,545,378 B2 | 4/2003 | Chen et al. | |
| 6,610,186 B1 | 8/2003 | Mayer et al. | |
| 6,612,705 B1 | 9/2003 | Davidson et al. | |
| 6,628,017 B1 | 9/2003 | Chass | |
| 6,664,027 B2 | 12/2003 | Griffith et al. | |
| 6,665,042 B1 | 12/2003 | Marshall et al. | |
| 6,684,994 B1 | 2/2004 | Nunuparov | |
| 6,738,176 B2 | 5/2004 | Rabinowitz et al. | |
| 6,754,571 B2 | 6/2004 | Gade et al. | |
| 6,780,696 B1 | 8/2004 | Schatz | |
| 6,794,664 B1 | 9/2004 | Mitchell et al. | |
| 6,835,227 B2 | 12/2004 | Lian et al. | |
| 6,838,963 B2 | 1/2005 | Zimmerling et al. | |
| 6,842,671 B2 | 1/2005 | Tropper | |
| 6,843,573 B2 | 1/2005 | Rabinowitz et al. | |
| 2001/0045530 A1 | 11/2001 | Haeberle et al. | |
| 2002/0089245 A1 | 7/2002 | Chen et al. | |
| 2002/0090565 A1 | 7/2002 | Griffith et al. | |
| 2002/0153781 A1 | 10/2002 | Chass | |
| 2002/0171067 A1 | 11/2002 | Jolly et al. | |
| 2002/0176597 A1 | 11/2002 | Petroff et al. | |
| 2003/0012693 A1 | 1/2003 | Otillar et al. | |
| 2003/0116747 A1 | 6/2003 | Lem et al. | |
| 2003/0156337 A1 | 8/2003 | Davidson et al. | |
| 2003/0202235 A1 | 10/2003 | Rabinowitz et al. | |
| 2004/0012470 A1 | 1/2004 | Zimmerling et al. | |
| 2004/0021964 A1 | 2/2004 | Rabinowitz et al. | |
| 2004/0035605 A1 | 2/2004 | Griffith et al. | |
| 2004/0103754 A1 | 6/2004 | Lian et al. | |
| 2004/0125019 A1 | 7/2004 | Rawnick et al. | |
| 2004/0161332 A1 | 8/2004 | Rabinowitz et al. | |
| 2004/0178869 A1 | 9/2004 | Brown et al. | |
| 2004/0180179 A1 | 9/2004 | Lambertini et al. | |
| 2004/0184631 A1 | 9/2004 | Hosler | |
| 2004/0207481 A1 | 10/2004 | Brown et al. | |
| 2004/0207494 A1 | 10/2004 | Brown et al. | |
| 2004/0212449 A1 | 10/2004 | Rawnick et al. | |
| 2004/0236269 A1 | 11/2004 | Marchitto et al. | |
| 2005/0007209 A1 | 1/2005 | Brown et al. | |
| 2005/0009303 A1 | 1/2005 | Schatz | |
| 2005/0030119 A1 | 2/2005 | Rawnick et al. | |
| 2005/0030238 A1 | 2/2005 | Brown et al. | |
| 2005/0034750 A1 | 2/2005 | Rabinowitz | |

FOREIGN PATENT DOCUMENTS

| | | |
|---|---|---|
| DE | A1 19855948 | 6/2000 |
| DE | A1 10005192 | 8/2001 |
| DE | A1 10027679 | 12/2001 |
| DE | A1 10141862 | 5/2002 |
| DE | A1 10215738 | 11/2002 |
| DE | C2 4131999 | 8/2003 |
| EP | A3 0356145 | 2/1990 |
| EP | B1 0261672 | 3/1991 |
| EP | A1 0580147 | 1/1994 |
| EP | B1 0380762 | 1/1994 |
| EP | B1 0411038 | 12/1994 |
| EP | B1 0505655 | 11/1995 |
| EP | A3 0860609 | 8/1998 |
| EP | B1 0625267 | 11/1998 |
| EP | A1 0980991 | 2/2000 |
| EP | A1 0998016 | 5/2000 |
| EP | B1 0684528 | 9/2001 |
| EP | A1 1178597 | 2/2002 |
| EP | B1 0909901 | 5/2002 |
| EP | A1 1361585 | 11/2003 |
| EP | A2 1398296 | 3/2004 |
| FR | A1 2523364 | 9/1983 |
| FR | A1 2633561 | 1/1990 |
| FR | A1 2644289 | 9/1990 |
| FR | A1 2756501 | 6/1998 |
| FR | A1 2818304 | 6/2002 |
| GB | A 1206680 | 9/1970 |
| GB | A 1223710 | 3/1971 |
| GB | A 1511347 | 5/1978 |

| | | | | | | |
|---|---|---|---|---|---|---|
| GB | A 1586812 | 3/1981 | | WO | WO 9948643 | 9/1999 |
| GB | A 1588005 | 4/1981 | | WO | WO 0037298 | 6/2000 |
| GB | A 2181818 | 4/1987 | | WO | WO 02093589 | 11/2002 |
| GB | A 2249636 | 5/1992 | | WO | WO 03053593 | 7/2003 |
| JP | 10299283 | 11/1998 | | WO | WO 03081976 | 10/2003 |
| WO | WO 9414294 | 6/1994 | | WO | WO 03107078 | 12/2003 |
| WO | WO 9515068 | 6/1995 | | WO | WO 2004018128 | 3/2004 |
| WO | WO 9641354 | 12/1996 | | WO | WO 2004042685 | 5/2004 |
| WO | WO 9822727 | 5/1998 | | | | |

* cited by examiner

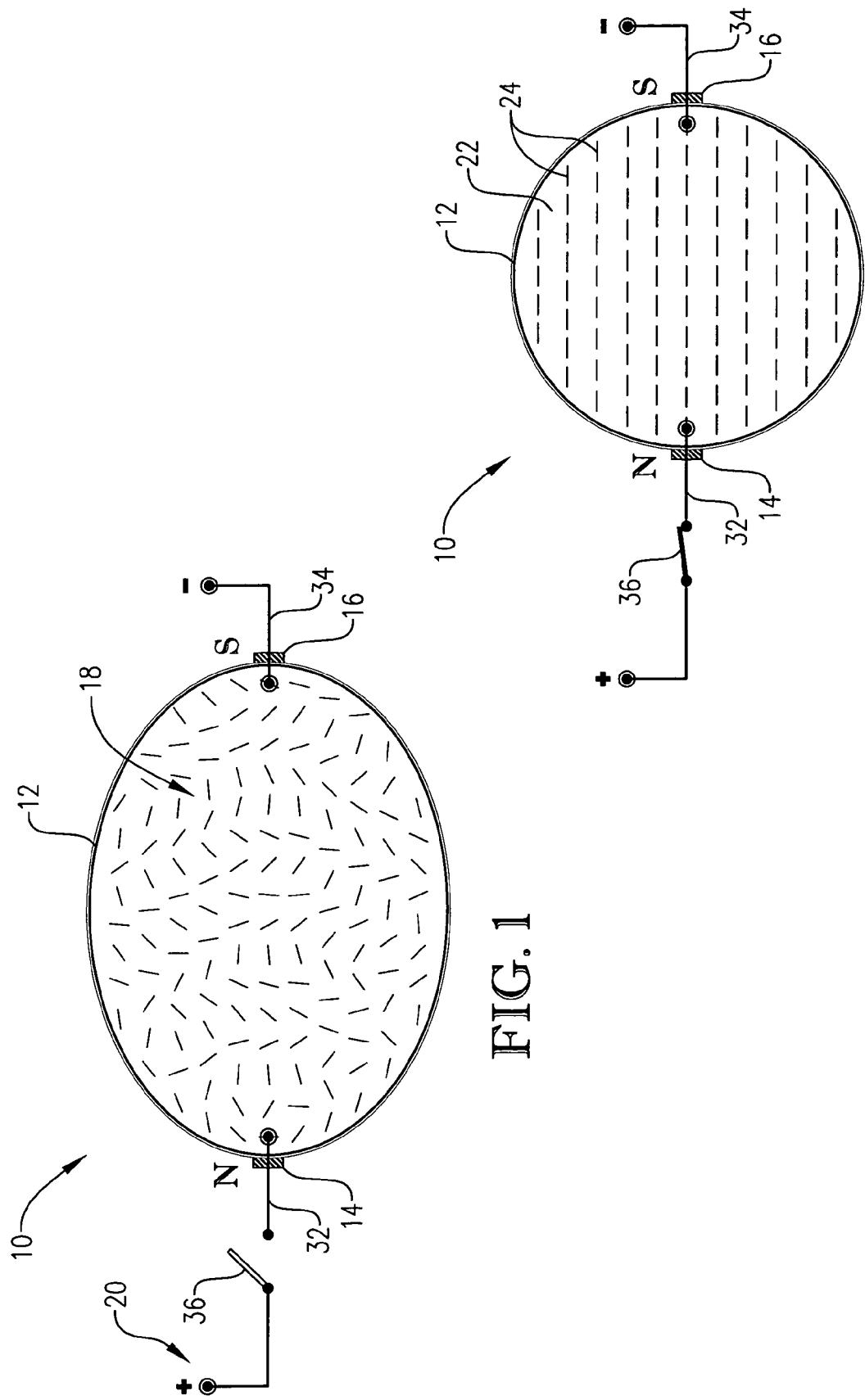

ELECTROMAGNETIC RHEOLOGICAL (EMR) FLUID AND METHOD FOR USING THE EMR FLUID

RELATED APPLICATIONS

This application claims the benefit of U.S. Provisional Application No. 60/573,567 filed May 21, 2004 and entitled ELECTROMAGNETIC RHEOLOGICAL FLUID that is hereby incorporated herein by reference.

BACKGROUND OF THE INVENTION

1. Field of the Invention

The present invention relates generally to complex fluids. More specifically, the present invention concerns a complex fluid that includes a conductive medium and micronparticles suspended therein, wherein each micronparticle includes a magnetically permeable core coated by an electrically insulating material and a conductive winding there around so that when a current is passed through the fluid, it "flows" along the windings inducing an electromagnetic field around each micronparticle, thereby affecting the properties of the fluid.

2. Discussion of Prior Art

There are a wide range of complex fluids known in the art. One particular class of these fluids includes "smart fluids." Certain types of smart fluid are known to change viscosity in the presence of certain external forces. For example, electrorheological (ER) fluids and magneto-rheological (MR) fluids are known colloidal suspension of particles that respond to either an electrical or magnetic field external to the fluid. ER and MR fluids are known to exhibit a marked increase in viscosity in the presence of electrical and magnetic fields, respectively. This change in viscosity is extremely rapid (e.g., 1-10 milliseconds). When the external field is removed, these fluids return to their original state. It is known in the art to use these fluids as working fluids for various machines and apparatus such as dampers, actuators, ink-jet color recording, and the like.

However, all of these prior art complex fluids suffer from several undesirable problems and limitations. For example, while it is known that ER and MR fluids allow rapid changes in apparent viscosity in the presence of electrical and magnetic fields, these effects are dependent upon the fields external to the fluid. In this regard, the distance into the fluid over which the rheological properties hold is undesirably limited. That is, the effects are greatest at close proximity to the origin of the external field and diminish moving further into the fluid and further away from the origin of the field. In addition, ER and MR fluids are not able to exert a force in and of themselves. That is, these fluids have particles that align due to an external field, but cannot exert a force in and of themselves. These problems and limitations render these prior art fluids poorly suited for certain applications. Accordingly, there is a need for an improved complex fluid that does not suffer from these problems and limitations.

SUMMARY OF THE INVENTION

The present invention provides an improved complex fluid that does not suffer from the problems and limitations of the prior art complex fluids discussed above. The inventive complex fluid can readily change properties by passing a relatively small electric current through the fluid itself. Property changes enabled in the improved complex fluid include, among others, enhanced interparticle attraction thereby increasing a uniform change in the rheological properties throughout the entire fluid. Additionally, the internal particles of the inventive complex fluid exert internal forces themselves thus enabling changes in the fluid's morphology, thereby enabling the inventive fluid to do work on the walls of the membrane or container housing the fluid. In this regard, the inventive complex fluid is well suited for use in a wide range of new applications not possible with prior art complex fluids, such as the primary working component in an artificial muscle cell.

A first aspect of the present invention concerns a complex fluid broadly including a conducting medium, and a plurality of micronparticles suspended in the medium. Each of the micronparticles includes a magnetically permeable core, an electrically insulating coating surrounding the core, and a conductive winding at least partially wound around the core so that the coating is disposed between the winding and the core.

A second aspect of the present invention concerns an apparatus broadly including a membrane, a pair of magnetically-susceptible plates coupled to the outside of the membrane and diametrically opposed so as to be operable to provide magnetic poles to the membrane, a complex fluid contained within the membrane, and a current source operable to be in electrical communication with the complex fluid. The complex fluid includes a conducting medium, and a plurality of micronparticles suspended in the medium. Each of the micronparticles includes a magnetically permeable core, an electrically insulating coating surrounding the core, and a conductive winding at least partially wound around the core so that the coating is disposed between the winding and the core.

A third aspect of the present invention concerns a method of exerting a force on a deformable membrane having an initial resting state. The method broadly includes the steps of coupling a pair of magnetically-susceptible plates on the outside of the membrane and diametrically opposing the plates so the plates are operable to provide opposing magnetic poles to the membrane, filling the membrane with a conductive medium, suspending micronparticles within the medium wherein each micronparticle includes a magnetically permeable core, an electrically insulating coating surrounding the core, and a conductive winding at least partially wound around the core so that the coating is disposed between the winding and the core, and passing a current through the windings until sufficient micronparticles align to draw the plates closer together to move the membrane out of the initial resting state.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a schematic diagram of a membrane having a pair of external magnetically-susceptible plates and filled with a complex EMR fluid in communication with a current source constructed in accordance with a preferred embodiment of the present invention and shown in the initial resting state;

FIG. 2 is a schematic diagram of the EMR fluid-laden membrane illustrated in FIG. 1 and shown in the aligned state with the current source flowing current through the EMR fluid;

Figure 6:
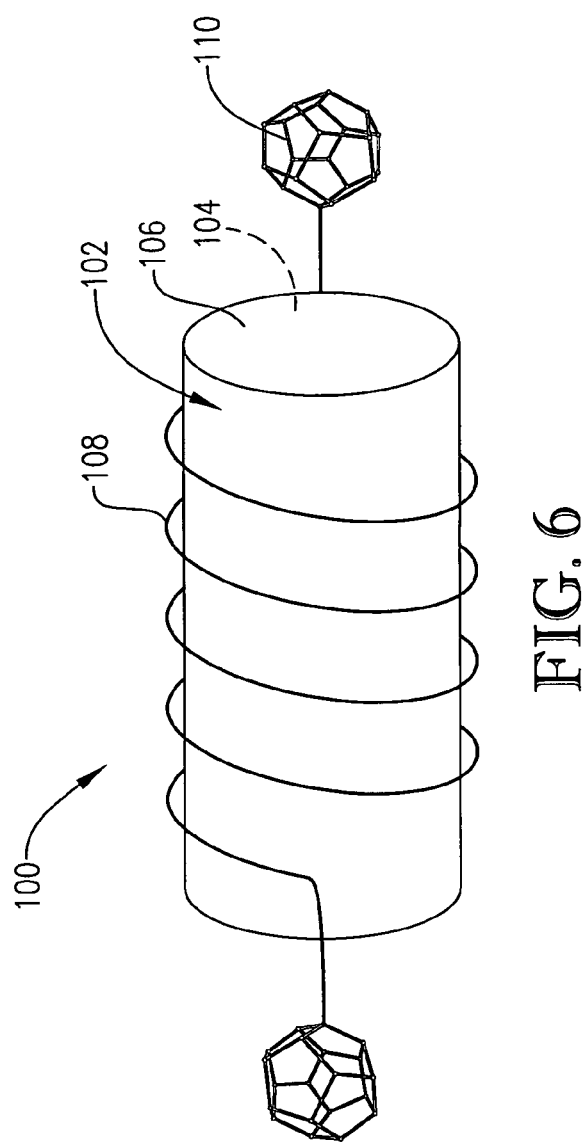
Figure 5:
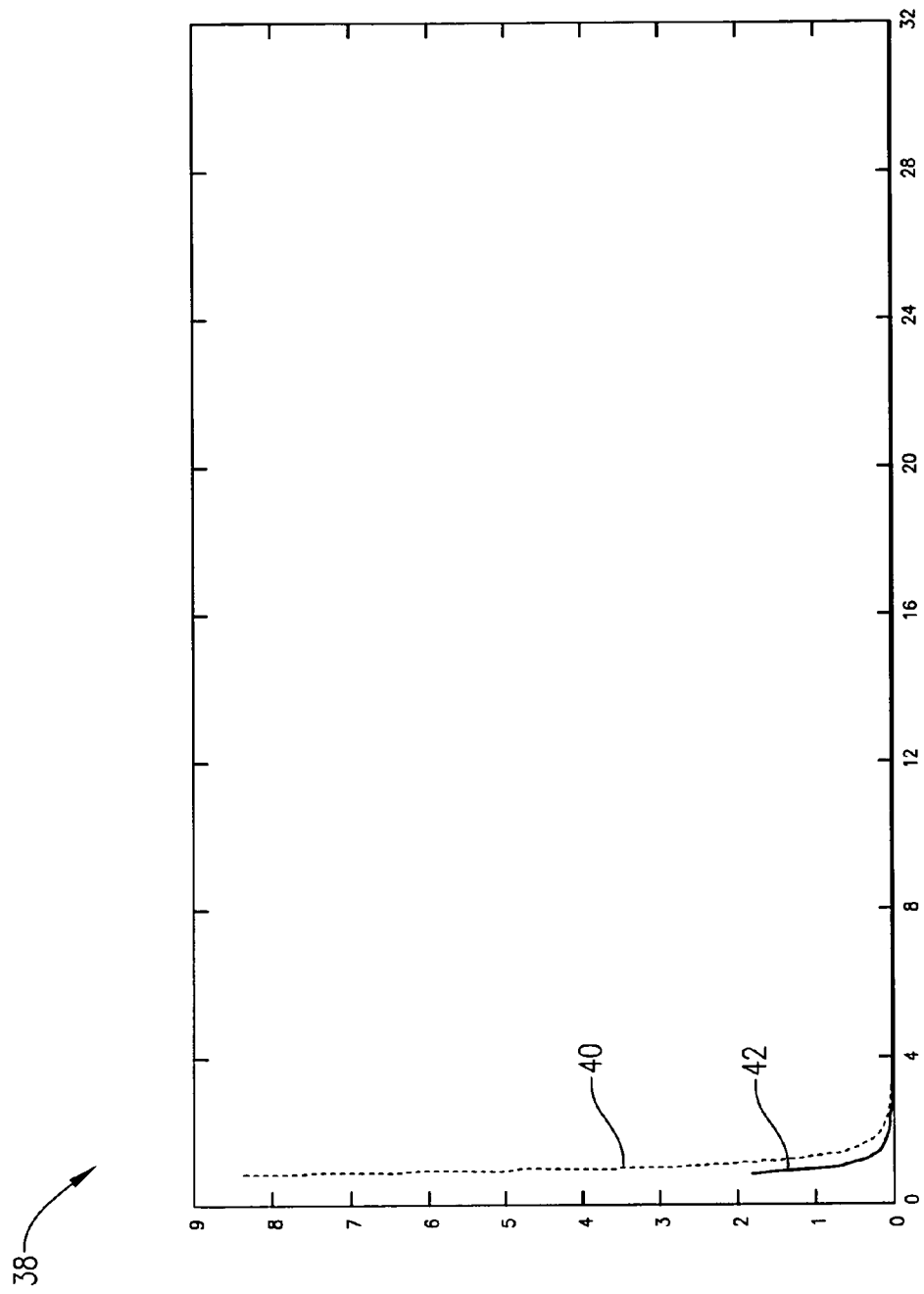

FIG. 5 is a graph illustrating the relative magnitudes of the magnetic field force versus the electric field force as the distance between two adjacent micronparticles varies when current flows through the EMR fluid; and FIG. 6 is a schematic diagram of a micronparticle of a complex EMR fluid constructed in accordance with a preferred alternative embodiment of the present invention having conductivity-enhancing molecules attached to each end of the winding.

DETAILED DESCRIPTION OF THE PREFERRED EMBODIMENTS

FIG. 1 illustrates an apparatus 10 constructed in accordance with a preferred embodiment of the present invention and broadly including a membrane 12, a pair of polar opposed magnetically-susceptible plates 14 and 16 coupled to the membrane 12, an electromagnetic rheological ("EMR") fluid 18 filling the membrane 12 and being in communication with a current source 20. The present invention is not limited to any particular application of the EMR fluid and it will be appreciated that the EMR fluid could be used in various applications, including those applications that currently utilize prior art ER fluids and MR fluids, in addition to a wide range of new applications previously unavailable to complex fluids. It will also be appreciated that certain variables of the EMR fluid could be alternatively configured to enhance the EMR fluids utilization in a particular application, depending on the desired morphological and/or rheological properties. The illustrated EMR fluid 18 broadly includes a conducting medium 22, and a plurality of micronparticles 24 suspended in the medium 22, wherein each of the micronparticles 24 includes a magnetically permeable core 26, an electrically insulating coating 28 surrounding the core 26, and a conductive winding 30 at least partially wound around the core 26 so that the coating 28 is disposed between the winding 30 and the core 26 (see FIGS. 1-3).

For purposes that will subsequently be described, the EMR fluid 18 must be sufficiently conductive to enable a current to pass through the fluid 18 and be configured to allow the particles within the fluid 18 to remain in suspension against gravitational forces yet move in response to the magnetic forces generated. In this regard, the illustrated EMR fluid 18 is a colloidal suspension. In more detail, and turning to FIGS. 1 and 2, the illustrated conductive medium 22 is a gel having the micronparticles 24 suspended therein. The gel 22 is sufficiently conductive to enable a current to flow therethrough and sufficiently fluid to enable the micronparticles 24 to move in the gel 22. Any suitable prior art conducting gel will suffice. In addition, for purposes that will subsequently be described, the gel 22 preferably has enhanced magnetic permeability. One such suitable gel is an electrically conducting ferrofluid, as are known in the art. For purposes that will be further detailed below, it is important the EMR fluid 18 be configured to enable a current to preferentially "flow" through the micronparticles 24. In this regard, it may be desirable to increase the conductivity of the gel 22, such as by adding a plurality of conductive particles (not shown) suspended therein (e.g., heavy metal ions, such as gallium, or the like). Although the illustrated colloidal suspension is monodisperse, the suspension could be alternatively configured, such as a polydisperse or binary suspension. Additionally, while it is believed a conducting gel is well suited for the conducting medium 22, the medium 22 could be variously alternatively configured, and could include for example any suitable conductive fluids known in the art, so long as the overall medium is sufficiently conductive to enable a current to flow through the medium from one suspended micronparticle 24 to the next and allow these micronparticles 24 to move in response to the magnetic forces generated.

As previously indicated, the micronparticles 24 are suspended in the conductive medium 22 and each includes the magnetically permeable core 26, the electrically insulating coating 28, and the conductive winding 30 at least partially wound around the core 26 so that the coating 28 is disposed between the winding 30 and the core 26. Each of the micronparticles 24 is configured to behave as a small electromagnet when current is passed through the winding 30. In more detail, and turning to FIGS. 3 and 4, the magnetically permeable core 26 must be sufficiently magnetically permeable and sized and configured so that a magnetic field is generated when current is passed through the winding 30 sufficient in magnitude to movingly attract an adjacent micronparticle 24. In this regard, the illustrated core 26 is a ferrous rod, preferably about 1000 microns in length, and having about a 1:10 diameter-to-length ratio. The illustrated core 26 is surrounded by the electrically insulating coating 28 (see FIG. 3). As further detailed below, it is important that the magnetic field generated by the micronparticles 24 themselves be the primary source for aligning the micronparticles 24. In this regard, it is believed that the use of a non-conductive coating 28 will allow the wound conductor 30 to be insulated form the permeable core 26 allowing the formation of an electromagnet in the presence of a current. The non-conductive coating 28 could be any suitable non-conductive material, such as synthetic resins or the like. The magnetically permeable core 26 could be variously alternatively configured and, for example, could be of any suitable size and shape whether micron in scale or not (e.g., nano in scale or larger). However, it is important that when a current is passed through the winding 30, the micronparticle 24 generates a sufficient magnetic field to movingly attract the next nearest micronparticle 24.

Figure 3:
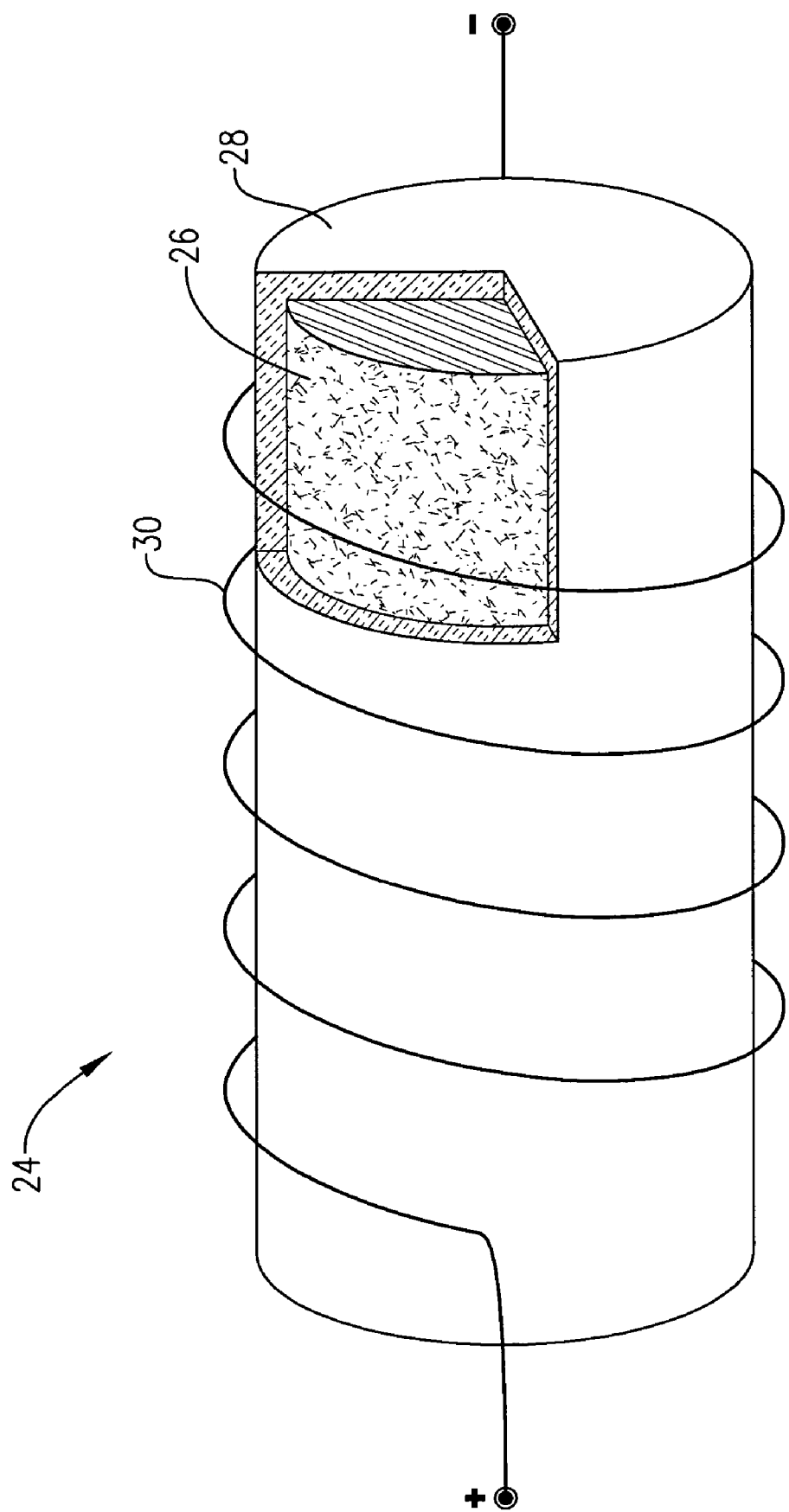
FIG. 3 is a schematic diagram of one of the micronparticles of the EMR fluid illustrated in FIGS. 1-2.
Figure 4:
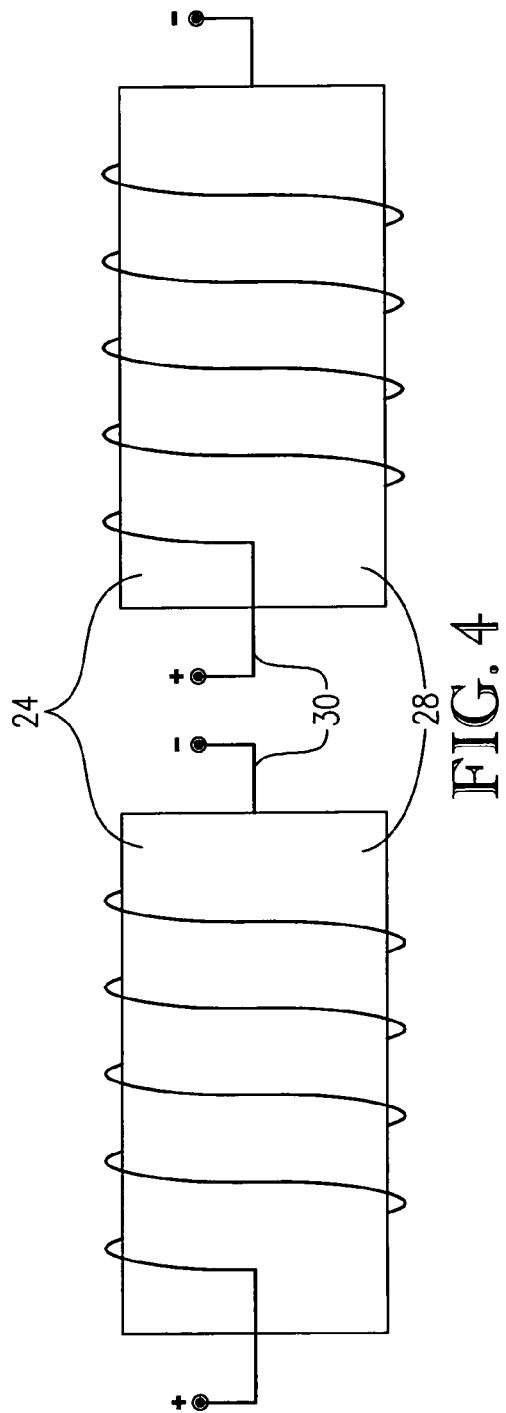
FIG. 4 is a schematic diagram of a pair of the micronparticles of the EMR fluid illustrated in FIGS. 1-4 showing the micronparticles in the aligned state.

The winding 30 must be sufficiently conductive to carry electric current and must sufficiently circumnavigate the combination of the core 26 and the non-conductive coating 28 to impart sufficient direction to the current to induce the desired magnetic field. In more detail, and as shown in FIGS. 3 and 4, the illustrated winding 30 is a wire-like structure that is closely "wound" around the non-conductive coating 28 in a clockwise winding. It is important that the winding 30 behave like a wire so that current freely flows therethrough. Additionally, for purposes that will subsequently be described, the conductivity must be sufficient that current preferentially travels through the EMR fluid 18 along the windings 30, as opposed to the conductive gel 22. In this regard, the illustrated winding 30 is preferably a carbon nanotube formed into a helix. It is known in the art that these carbon nanotubes possess extremely high degrees of conductivity and can be produced in single layer configurations that can be formed into various shapes, including that of a helix. Because the micronparticles 24 are free to turn and flip within the gel 22, the direction of the "winding" is unimportant. In other words, regardless of the direction of flow of current, and thus the resultant orientation of the magnetic field, the north pole of the field is free to move and seek out the next nearest south pole for moving attraction. Additionally, the number of "windings" can be altered to effect the strength of the field relative to the magnitude of the current as long as the product of current and number of turns is sufficient to induce a magnetic field sufficient to cooperate with the next nearest magnetic field to movingly attract the adjacent micronparticles 24. The winding 30 could be variously alternatively configured and for example, could be formed of copper, silver ions, various acids, proteins, or polymers arranged around the core 26 or formed directly on the non-conductive coating 28. However, it is important that the winding 30 be sufficiently conductive to preferentially draw the current through the EMR fluid 18 and impart sufficient direction to the current around the core 26 to induce a movement-causing magnetic field. Alternatively, it may be desirable to attach a conductivity-enhancing ion on each end of the winding 30.

As previously indicated, in the illustrated apparatus 10, the EMR fluid 18 fills the membrane 12 and is in electric communication with the current source 20. Returning now to FIGS. 1-2, the membrane 12 is sufficiently deformable and flexible to move with the EMR fluid 18, but otherwise could comprise any suitable container sufficient to house the EMR fluid 18. The illustrated membrane 12 is deformable, but biased or shape-retaining into its initial ellipsoid, or football shape. The plates 14,16 are coupled to the outside of the membrane 12 and aligned at opposite ends of the major axis (see FIG. 1). The plates 14,16 are magnetically-susceptible so as to be operable to provide the membrane 12 with north and south polar ends. In this regard, the plates 14,16 are preferably formed from soft magnetic materials so that it is easily and readily magnetized in the presence of a magnetic field and easily and readily demagnetized in the absence of the field. Suitable materials are any soft ferromagnetic materials. Soft magnetic materials are also preferred because they are not magnetized in the absence of the magnetic field and thus do not act to prematurely align the micronparticles 24 adjacent the plates 14,16 prior to the current being applied. However, the plates 14,16 could be alternatively configured and could include any suitable diamagnetic, paramagnetic, or ferromagnetic materials or the like. Alternatively, the plates 14, 16 could comprise magnets, either permanent, electromagnetic, or otherwise. However, if magnets are used, they should be configured so that the magnetic field they generate are weaker than the magnetic fields generated by the micronparticles 24 when the current is applied. In this manner, while some alignment of the micronparticles 24 nearest the magnets 14,16 will occur prior to current flowing through the fluid 18, the magnetic field of strength of the magnets 14,16 should be such that the fields do not permeate far into the membrane 12. It is important that whatever material is used for the plates 14, 16 be magnetically-susceptible so as to at least be magnetized in the presence of the magnetic fields generated by the adjacent micronparticles 24 when the current is applied.

The current source 20 is in electric communication with the EMR fluid 18 and must be able to supply a current sufficient to flow through the plurality of micronparticles 24 through the gel 22. The illustrated current source 20 includes a pair of wire leads 32 and 34 in contact with the fluid 18 within the membrane 12 and in circuit with a source of electricity (not shown, but for example, AC power, DC power with an inverter, a battery, etc.) and a switch 36 for selectively controlling current flow from the positive lead 32 into the fluid 18 and ultimately to the negative lead 34. The illustrated leads 32,34 pass through the corresponding plates 14 and 16, respectively. In this manner, current will flow generally along the major axis of the membrane 12 between the plates 14,16. The switch 36 is shiftable between an off position, as shown in FIG. 1 wherein no current flows from the source 20 into the EMR fluid 18, and an on position, as shown in FIG. 2 wherein current flows from the source 20 into the EMR fluid 18. The EMR fluid 18 could be housed in various alternatively configured containers consistent with the particular application. However, it is believed that the principles of the present invention are particularly well suited for use in building artificial muscle cells. Similarly, while it is important that the current source be operable to supply a selectable current sufficient to flow through the micronparticles 24, the current source could be variously alternatively configured consistent with the particular application, and for example, could be programmable, automated, or otherwise modified, to alternate current flow into the EMR fluid.

When the switch 36 is in the off position and no current is flowing from the current source 20 into the EMR fluid 18, the EMR fluid-filled membrane 12 is in an initial resting state as shown in FIG. 1 wherein the micronparticles 24 are generally not in any ordered alignment. When the switch 36 is switched to the on position and current flows form the source 20 into the EMR fluid 18, the EMR fluid-laden membrane 12 shifts out of the initial resting state. In more detail, current in the positive lead 32 is drawn through the conductive medium 22 where it flows through the adjacent windings 30. This in turn induces magnetic fields in the corresponding micronparticles 24. When magnetic fields are induced in adjacent micronparticles 24, the proximity of the fields mutually draw the adjacent micronparticles 24 causing them to move together into a north pole-south pole alignment as shown in FIG. 4. As current continues to flow through the next adjacent windings 30, the micronparticles 24 move into a highly ordered alignment as depicted in FIG. 2. When the micronparticles 24 align in this highly ordered alignment, generally along the major axis of current flow, plates 14,16, having become magnetized and polarized in the presence of the adjacent fields, are drawn in shortening the polar ends of the membrane 12 and in turn pushing out the walls of the membrane 12 parallel to the axes of current flow, thereby causing the EMR fluid-filled membrane 12 to shift out of the initial resting state—i.e., into the rounder, basketball shape—as shown in FIG. 2. It is believed that the flow of current through the EMR fluid 18 is enhanced by the electrical field which induces the micronparticles 24 nearest the leads 32, 34 to initially begin alignment, and further enhanced as current flow through the windings 30 begins ordering subsequent micronparticles 24. As with many prior art ER and MR fluids, the response time in the EMR fluid 18 shifting out of the initial resting state is very rapid once the current is applied, and is believed to be on the order of about 1-10 milliseconds. Additionally, similar to the prior art ER and MR fluids, once the current is removed, the EMR fluid 18, and thus the membrane 12, return to the initial resting state.

As indicated above, to achieve the desired change in morphology of the EMR fluid 18, it is important that the ordering movement of the micronparticles 24 be primarily achieved by the attraction of the magnetic fields generated by the micronparticles 24, as opposed to some general alignment occasioned by whatever electric field or magnetic field is exposed externally to the fluid 18. In this regard, the relative force of the magnetic field induced by current flow through the windings should be at least about equal to or greater than the force of each of the electric field caused by the voltage drop across the leads 32, 34 and whatever magnetic fields are induced in the plates 14,16. It is believed utilizing a winding 30 with a relatively high conductivity in combination with the relatively short distances between the adjacent micronparticles 24 enable a relatively low current (and thus low voltage drop and relatively weaker electric field) to generate relatively strong magnetic fields. In this regard, it may be desirable to increase the magnetic permeability of the gel 22 itself, such as by using a ferrofluid (e.g., having a relative permeability of 40) as the conductive medium.

In more detail, FIG. 5 shows a graph 38 depicting the relative magnitudes (the Y axis of the graph 38) of the magnetic field force 40 of the micronparticles 24 versus the electric field force 42 of the current source 20 as the distance between two adjacent micronparticles 24 (the X axis of the graph 38) varies when current flows through the EMR fluid 18. Although whole numbers are depicted along the Y axis of the graph 38, these are used to indicate the relative value of the forces rather than the absolute values of each particular force (e.g., the absolute values of the forces in millinewtons would be less than the 10e0 illustrated scale). The X axis depicts the distance between two adjacent micronparticles 24 in factors of particle length between them (e.g., 4 represents 4 particle lengths between each particle, etc.). The graph 38 is derived by assuming a 1.5 milliamp current is applied through two adjacent micronparticles 24, each having a 0.1 mm diameter by 1 mm long ferrous core with 100 winds of a current-carrying copper conductor 30 wound there around. The force 42 of the electric field is derived by assuming the 100 turns cover the length of the particle. The force 40 of the magnetic field is derived by using Coulomb's Law. As shown in the graph 38 of FIG. 5, when the distance between the two micronparticles 24 is about two particle lengths, the force 40 of the magnetic field induced by the current is more than four times greater than the force 42 of the electric field occasioned by generating the current. At a distance of one particle length, or half of the two particle length distance, this difference is even more significant and on the order of a factor of 16. Preferably, the particles would all be about one particle length apart—i.e., the fluid would have about a 50% density.

The apparatus 10 could be variously alternatively configured. For example, more than one current source could be utilized to selectively affect desired changes in the morphology of the EMR fluid, such as have two current sources that generate alternating current flowing generally along perpendicularly aligned axes (between two pairs of plates) to "pulse" the membrane. Additionally, the EMR fluid could be contained in a membrane having larger exterior surface areas, such as a sleeve or a sheet, to increase the net work performed by the EMR fluid.

In operation, the membrane 12 is filled with the EMR fluid 18 and placed in electric communication with the current source 20. While the switch 36 is in the off position, no current flows through the fluid 18 and the fluid 18 and membrane 12 remain in the initial resting state as shown in FIG. 1. When the switch 36 is switched to the on position, current flows from the source 20 and through the EMR fluid 18 between the leads 32, 34 by way of the windings 30. As current flows through each winding 30, a magnetic field is induced in each corresponding micronparticle 24 causing adjacent micronparticles 24 to movingly attract into a highly ordered north pole-south pole alignment. This in turn magnetizes the plates 14,16 thus attracting them to the highly ordered micronparticles 24 and causing them to be drawn closer together shortening the polar ends of the membrane 12 thereby causing the membrane 12 to shift out of the initial resting state as shown in FIG. 2. When the switch 36 is switched back to the off position and current ceases to flow through the EMR fluid 18, the EMR fluid 18 and the membrane 12 return to the initial resting state.

As indicated above, apparatus 10 and the EMR fluid 18 could be variously alternatively configured. One such suitable alternative is the EMR fluid 100 illustrated in FIG. 6. The EMR fluid 100 is similar in many respects to the EMR fluid 18 described in detail above and includes a plurality of micronparticles 102 suspended in a conductive medium (not shown) wherein each micronparticle 102 includes a magnetically permeable core 104, an electrically insulated coating 106 surrounding the core 104, and a conductive winding 108 at least partially encircling the core 104 so that the coating 106 is disposed between the winding 108 and the core 104. However, unlike the previously described windings, the winding 108 includes a conductivity-enhancing molecule 110 attached at each end of the winding 108. The molecules 110 could be any suitable conductivity-enhancing molecule, such as various metal ions.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A complex fluid comprising:
   a conducting medium; and
   a plurality of micronparticles suspended in the medium,
   each of said micronparticles including a magnetically permeable core, an electrically insulating coating surrounding the core, and a conductive winding at least partially wound around the core so that the coating is disposed between the winding and the core.

2. The complex fluid as claimed in claim 1,
   each of said micronparticles further including a conductivity-enhancing molecule attached at each end of the winding.

3. The complex fluid as claimed in claim 1,
   each of said micronparticles being about 1 millimeter in length or less.

4. The complex fluid as claimed in claim 3,
   each of said micronparticles presenting about a 1:10 ratio of diameter to length.

5. The complex fluid as claimed in claim 1,
   each of said windings being operable to allow current to flow therethrough.

6. The complex fluid as claimed in claim 5,
   each of said micronparticles being operable to generate a magnetic field when current flows through said windings.

7. The complex fluid as claimed in claim 6,
   said micronparticles being in an initial resting state wherein the micronparticles are generally unaligned,
   each of said micronparticles being operable to align with adjacent micronparticles when current flows through the windings and thereby shift out of the initial resting state.

8. The complex fluid as claimed in claim 7,
   said micronparticles being operable to return to the initial resting state when current ceases to flow through the windings.

9. The complex fluid as claimed in claim 1,
   said magnetically permeable core being at least partially ferrous.

10. An apparatus comprising:
    a membrane;
    a pair of magnetically-susceptible plates coupled to the outside of the membrane and diametrically opposed, said plates being operable to provide magnetic poles to the membrane;

a complex fluid contained within the membrane; and a current source operable to be in electrical communication with the complex fluid, said complex fluid including a conducting medium, and a plurality of micronparticles suspended in the medium, each of said micronparticles including a magnetically permeable core, an electrically insulating coating surrounding the core, and a conductive winding at least partially wound around the core so that the coating is disposed between the winding and the core.

11. The apparatus as claimed in claim 10, each of said micronparticles further including a conductivity-enhancing molecule attached at each end of the winding.

12. The apparatus as claimed in claim 10, each of said micronparticles being about 1 millimeter or less in length.

13. The apparatus as claimed in claim 12, each of said micronparticles presenting about a 1:10 ratio of diameter to length.

14. The apparatus as claimed in claim 10, said current source selectively generating a current flowing through said windings when the current source is in electrical communication with the complex fluid.

15. The apparatus as claimed in claim 14, said current generating an electrical field when flowing through the fluid, each of said micronparticles generating a magnetic field when current flows through said windings.

16. The apparatus as claimed in claim 15, each of said magnetic fields being equal to or greater than said electrical field so that the magnetic fields cooperate to align the micronparticles when current flows through the windings and draw in the plates.

17. The apparatus as claimed in claim 16, said current source being selectable between an on phase wherein current flows through the windings and an off phase wherein current does not flow through the windings.

18. The apparatus as claimed in claim 17, said membrane being in an initial resting state when said current source is in the off phase, said membrane being shiftable out of the initial resting state when the current source is in the on phase and returning to the initial resting state when the current source is returned to the off phase.

19. The apparatus as claimed in claim 10, said magnetically permeable core being at least partially ferrous.

20. A method of exerting a force on a deformable membrane having an initial resting state, said method comprising the steps of:

(a) coupling a pair of magnetically-susceptible plates on the outside of the membrane and diametrically opposing the plates so that the plates are operable to provide opposing magnetic poles to the membrane;

(b) filling the membrane with a conductive medium;

(c) suspending micronparticles within the medium wherein each micronparticle includes a magnetically permeable core, an electrically insulating coating surrounding the core, and a conductive winding at least partially wound around the core so that the coating is disposed between the winding and the core; and (d) passing a current through the windings until sufficient micronparticles align to draw the plates closer together to move the membrane out of the initial resting state.

21. The method as claimed in claim 20, step (c) including the step of configuring each micronparticle so that passing the current through the winding induces a magnetic field.

22. The method as claimed in claim 21, step (d) including the step of configuring the current so that the current generates an electric field equal to or less than the magnetic field.

23. The method as claimed in claim 20, wherein at least one of the plates presents a soft magnetism.

24. The method as claimed in claim 20, wherein each micronparticle further includes a conductivity-enhancing molecule attached at each end of the winding.

25. The method as claimed in claim 20; and (e) terminating the current through the windings until the membrane returns to the initial resting state.

* * * * *